(12) United States Patent
Jang

(10) Patent No.: US 12,341,242 B2
(45) Date of Patent: Jun. 24, 2025

(54) MAGNETIC FIELD SHIELDING SHEET AND WIRELESS POWER TRANSFER MODULE INCLUDING THE SAME

(71) Applicant: AMOSENSE CO., LTD, Cheonan-si (KR)

(72) Inventor: Kil Jae Jang, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 144 days.

(21) Appl. No.: 18/555,854

(22) PCT Filed: Apr. 19, 2022

(86) PCT No.: PCT/KR2022/005604
§ 371 (c)(1),
(2) Date: Oct. 17, 2023

(87) PCT Pub. No.: WO2022/225305
PCT Pub. Date: Oct. 27, 2022

(65) Prior Publication Data
US 2024/0213667 A1    Jun. 27, 2024

(30) Foreign Application Priority Data
Apr. 19, 2021    (KR) .................. 10-2021-0050568

(51) Int. Cl.
*H01Q 1/52*    (2006.01)
*H01Q 1/38*    (2006.01)
(Continued)

(52) U.S. Cl.
CPC .............. *H01Q 1/526* (2013.01); *H01Q 1/38* (2013.01); *H02J 50/10* (2016.02); *H02J 50/70* (2016.02)

(58) Field of Classification Search
None
See application file for complete search history.

(56) References Cited

U.S. PATENT DOCUMENTS

| 11,916,399 | B2* | 2/2024 | Pei ......................... H02J 50/70 |
| 2019/0148988 | A1* | 5/2019 | Hwang ................ H01Q 1/526 307/104 |

(Continued)

FOREIGN PATENT DOCUMENTS

| KR | 10-2017-0010734 A | 2/2017 |
| KR | 10-2020-0005490 A | 1/2020 |

(Continued)

OTHER PUBLICATIONS

International Search Report for PCT/KR2022/005604 by Korean Intellectual Property Office dated Aug. 16, 2022.

*Primary Examiner* — Wilson Lee
(74) *Attorney, Agent, or Firm* — BROADVIEW IP LAW, PC

(57) ABSTRACT

A magnetic field shielding sheet is provided. The magnetic field shielding sheet according to an embodiment of the present invention is attached to a wireless power transfer antenna and a wireless communication antenna, and comprises: a shielding part made of a magnetic material so as to shield a magnetic field; and at least one eddy current-reducing pattern part which is formed in the shielding part to increase the resistance of the shielding part and thereby reduce the generation of eddy currents. The eddy current-reducing pattern part includes: a first eddy current-reducing pattern part formed to intersect with both the wireless power transfer antenna and the wireless communication antenna; and a second eddy current-reducing pattern part formed to intersect with the wireless communication antenna.

10 Claims, 6 Drawing Sheets

(51) Int. Cl.
*H02J 50/10* (2016.01)
*H02J 50/70* (2016.01)

(56) References Cited

U.S. PATENT DOCUMENTS

| | | | |
|---|---|---|---|
| 2019/0214180 A1* | 7/2019 | Yoon | H01F 1/28 |
| 2019/0267698 A1* | 8/2019 | Mukherjee | H01Q 7/00 |
| 2019/0334230 A1* | 10/2019 | Jesme | H04B 5/20 |
| 2020/0076244 A1* | 3/2020 | Smith | G01K 7/42 |
| 2022/0416574 A1* | 12/2022 | Kim | B60L 53/12 |

FOREIGN PATENT DOCUMENTS

| | | |
|---|---|---|
| KR | 10-2020-0032620 A | 3/2020 |
| KR | 10-2020-0144507 A | 12/2020 |
| KR | 10-2021-0011346 A | 2/2021 |

* cited by examiner

MAGNETIC FIELD SHIELDING SHEET AND WIRELESS POWER TRANSFER MODULE INCLUDING THE SAME

CROSS REFERENCE TO RELATED APPLICATION

This application is the national phase entry of International Application No. PCT/KR2022/005604, filed on Apr. 19, 2022, which is based upon and claims priority to and the benefit of Korean Patent Application No. 10-2021-0050568, filed on Apr. 19, 2021, the disclosures of which are incorporated herein by reference in its entirety.

TECHNICAL FIELD

The present invention relates to a magnetic field shielding sheet and a wireless power transfer module including the same.

BACKGROUND ART

Near field communication (NFC) and wireless charging are essentially non-contact transfer methods. This non-contact transfer method is implemented through an antenna that transmits or receives a magnetic field, and a magnetic field shielding sheet disposed on one surface of the antenna to smoothly transmit or receive the magnetic field.

Typically, sheets made of magnetic materials such as amorphous ribbon sheets, ferrite sheets, or polymer sheets are used as magnetic field shielding sheets.

Meanwhile, magnetic field shielding sheets are used in the form of sheets formed separately into multiple pieces to significantly reduce losses due to eddy currents or improve the flexibility of the sheets themselves.

For example, the magnetic field shielding sheet may be separated into multiple pieces through a flake process. That is, the flake process can separate the magnetic field shielding sheet into multiple pieces by passing the magnetic field shielding sheet multiple times between a metal roller provided with a plurality of concavo-convex or spherical balls on the outer surface and a rubber roller disposed opposite the metal roller.

However, as the flake process is repeatedly performed, the size of the separated pieces decreases while the total number of separated pieces increases, so the resistance of the shielding sheet increases, which reduces the effect of eddy currents, but there is a problem that the magnetic permeability of the shielding sheet falls below 1500.

In order to compensate for this decrease in magnetic permeability, the area or thickness of the magnetic field shielding sheet should be made larger.

However, in the case of recently developed mobile terminals, including foldable phones, though magnetic field shielding sheets with a saturation magnetic flux density of 1.7 T (Tesla) or more are required as permanent magnets are built into the device, there is a problem in that it is not easy to expand the area or thickness of the magnetic field shielding sheet because it requires miniaturization of the portable terminal itself and integrated arrangement of parts.

SUMMARY OF THE INVENTION

The present invention has been devised in view of the above problems, and is directed to providing a magnetic field shielding sheet capable of realizing high magnetic permeability of 2,000 or more while having a limited area and very thin thickness by forming an eddy current-reducing pattern part locally in a region corresponding to an antenna of the total area; and a wireless power transfer module including the same.

In addition, in an antenna unit including a wireless power transfer antenna and a wireless communication antenna, the present invention is directed to providing a magnetic field shielding sheet capable of preventing performance degradation of the wireless communication antenna by forming an eddy current-reducing pattern part at an appropriate location; and a wireless power transfer module including the same.

In order to achieve the above objects, the present invention provides a magnetic field shielding sheet, attached to a wireless power transfer antenna and a wireless communication antenna, the magnetic field shielding sheet including: a shielding part made of a magnetic material so as to shield a magnetic field; and at least one eddy current-reducing pattern part which is formed in the shielding part to increase the resistance of the shielding part and thereby reduce the generation of eddy currents, wherein the eddy current-reducing pattern part includes: a first eddy current-reducing pattern part formed to intersect with both the wireless power transfer antenna and the wireless communication antenna; and a second eddy current-reducing pattern part formed to intersect with the wireless communication antenna.

In addition, a plurality of first eddy current-reducing pattern parts may be disposed radially around a central portion of the wireless power transfer antenna, and the second eddy current-reducing pattern part may be formed to intersect with the pattern of the wireless communication antenna between at least one pair of the first eddy current-reducing pattern parts disposed adjacent to each other.

In addition, the first eddy current-reducing pattern part and the second eddy current-reducing pattern part may be formed linearly with a predetermined width and length, and the length of the second eddy current-reducing pattern part may be smaller than the length of the first eddy current-reducing pattern part.

In addition, the wireless communication antenna may include a first pattern disposed outside the wireless power transfer antenna and a first connection pattern connected to the first pattern, and the eddy current-reducing pattern part may be disposed so as not to overlap the first connection pattern.

In addition, the wireless communication antenna may include a second pattern disposed inside the wireless power transfer antenna and a second connection pattern connected to the second pattern, and the eddy current-reducing pattern part may be disposed so as not to overlap the second connection pattern.

In addition, the present invention provides a wireless power transfer module, including: a combo antenna unit including a wireless power transfer antenna and a wireless communication antenna formed in a pattern on upper portion of a circuit board; and a magnetic field shielding sheet disposed on one surface of the combo antenna unit, wherein the magnetic field shielding sheet is the magnetic field shielding sheet described above.

According to the present invention, through the eddy current-reducing pattern part, the overall resistance can be increased to reduce the occurrence of eddy currents and a high magnetic permeability of over 2,000 and a saturation magnetic flux density of over 1.7 T can be achieved while having a very thin thickness. Through this, it can be easily applied to the design of the latest mobile terminals that require intensive arrangement of components, such as foldable phones.

In addition, according to the present invention, by including the second eddy current-reducing pattern part having relatively small area loss, so that the number of first eddy current-reducing pattern parts having a relatively large area can be minimized, while partially supplementing the effect of eddy current reduction to secure antenna performance.

In addition, according to the present invention, by arranging the eddy current-reducing pattern part to be located to avoid a region where the wireless power transfer antenna and the wireless communication antenna overlap with each other, deterioration of antenna performance due to the introduction of the eddy current-reducing pattern part can be prevented.

DETAILED DESCRIPTION OF THE INVENTION

Figure 1:
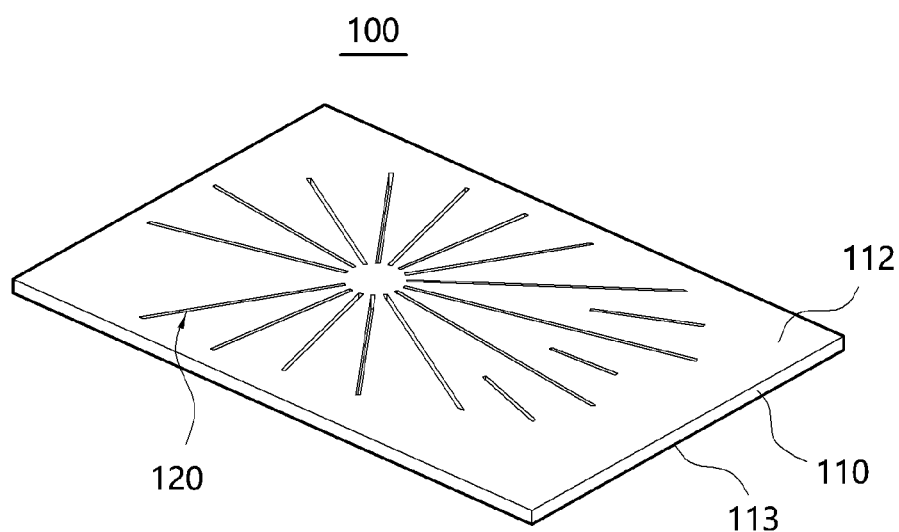
FIG. 1 is a view showing a magnetic field shielding sheet according to one embodiment of the present invention.

Hereinafter, embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention, and same or similar reference numerals denote same elements. In addition, the size or shape of components shown in the drawings may be exaggerated for clarity and convenience of explanation.

The magnetic field shielding sheet 100 according to an embodiment of the present invention is disposed on one surface of an antenna unit (see 200 of FIG. 5, and 200' of FIG. 6) to shield the magnetic field generated from the antenna unit 200 or 200' and can focus the magnetic field in a desired direction.

In this case, the antenna unit 200 or 200' may be formed in a combo type including either a wireless power transfer antenna 220 or a wireless communication antenna 230, or including both a wireless power transfer antenna 220 and a wireless communication antenna 230. A detailed description of this will be provided later, after first describing the main configuration of the magnetic field shielding sheet 100.

The magnetic field shielding sheet 100 according to an embodiment of the present invention includes a shielding part 110 and an eddy current-reducing pattern part 120, as shown in FIG. 1.

First, the shielding part 110 may be made of a magnetic material to shield the magnetic field generated from the antenna unit 200 or 200'.

In this case, the shielding part 110 may be formed of a material including a metal component.

For example, the shielding part 110 may include at least one of an amorphous alloy and a nanocrystal grain alloy. However, the material of the shielding part 110 is not limited thereto, and any known material used as a magnetic field shielding sheet such as ferrite, polymer, permalloy may be used.

Figure 2:
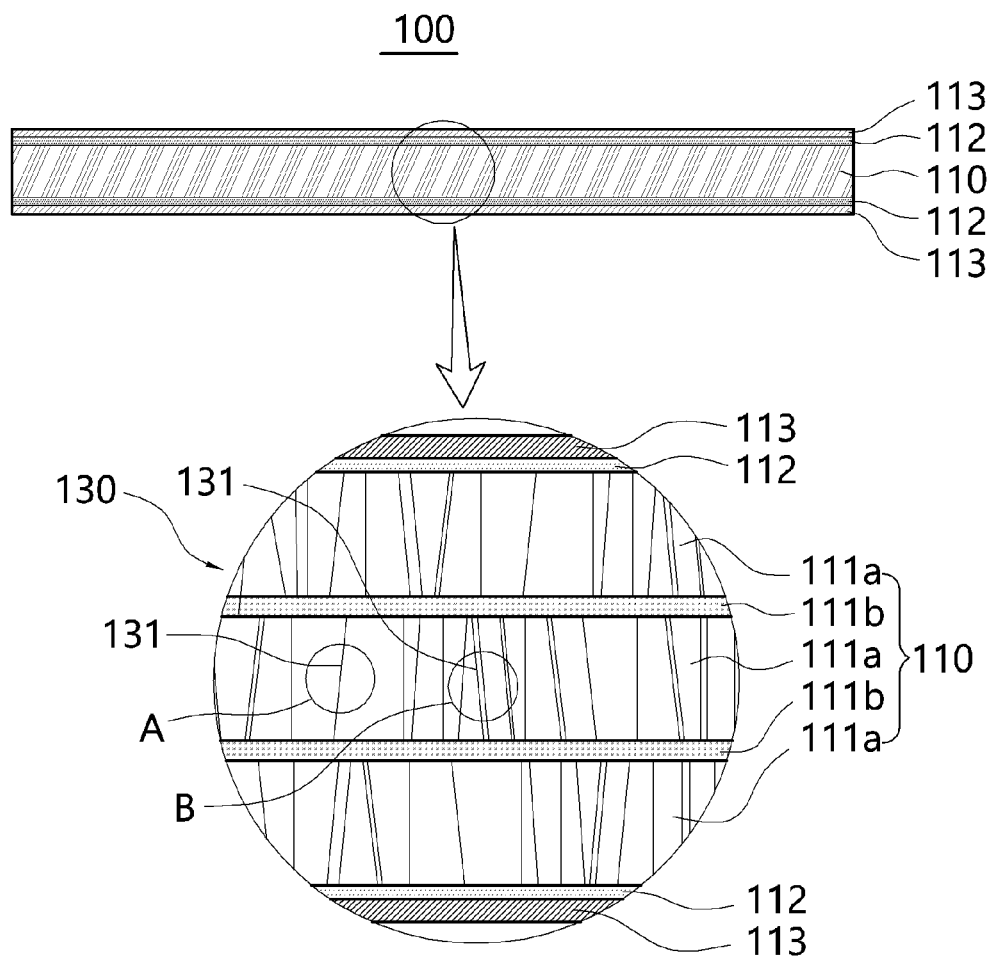
FIG. 2 is a cross-sectional view of FIG. 1.

In an embodiment of the present invention, the shielding part 110 may be formed of a single layer ribbon sheet 111a, but when used for wireless charging, as shown in FIG. 2, it may be formed as a multilayer sheet in which a plurality of ribbon sheets 111a are stacked in multiple layers via a first adhesive layer 111b.

In this case, each of the stacked ribbon sheets 111a may be made of the same material or may be formed to have different magnetic permeabilities, and for example, they may be a hybrid sheet that combines an amorphous alloy ribbon sheet and a nanocrystal grain alloy ribbon sheet.

And, each ribbon sheet 111a constituting the shielding part 110 may be a heat-treated ribbon sheet.

In addition, a protective film 113 may be attached to one side of the upper surface and lower surface of the shielding part 110 via a second adhesive layer 112, and on the other side of them, an adhesive bonding member (not shown) such as double-sided tape for bonding to an object to be attached may be disposed.

The magnetic field shielding sheet 100 according to an embodiment of the present invention may include an eddy current-reducing pattern part 120 formed on the inside of the shielding part 110.

In this case, the eddy current-reducing pattern part 120 is intended to reduce the occurrence of eddy currents by increasing the overall resistance of the aforementioned shielding part 110, and through this, it is possible to reduce the influence of the eddy currents generated from the shielding part 110 on the wireless power transfer antenna 220 and/or the wireless communication antenna 230 of the antenna unit 200 or 200'.

In an embodiment of the present invention, the eddy current-reducing pattern part 120 may be formed in one or more appropriate numbers in a partial region of the entire region of the shielding part 110, and may be partially formed in the partial region of the entire region of the shielding part 110.

In this case, the eddy current-reducing pattern part 120 may be disposed in the partial region of the region corresponding to the wireless power transfer antenna 220 and/or the wireless communication antenna 230 of the antenna unit 200 or 200' and, may be disposed in various positions depending on the shape and location of the antenna.

Figure 3:
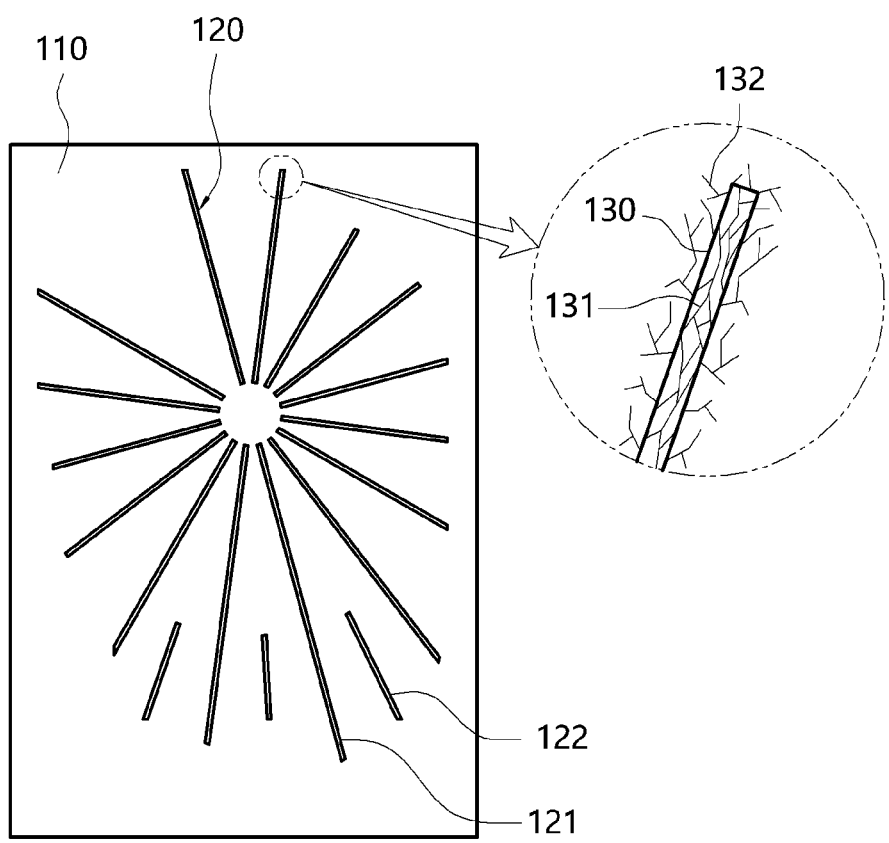
FIG. 3 is a view showing one form of an eddy current-reducing pattern part that can be applied to FIG. 1.
Figure 4:
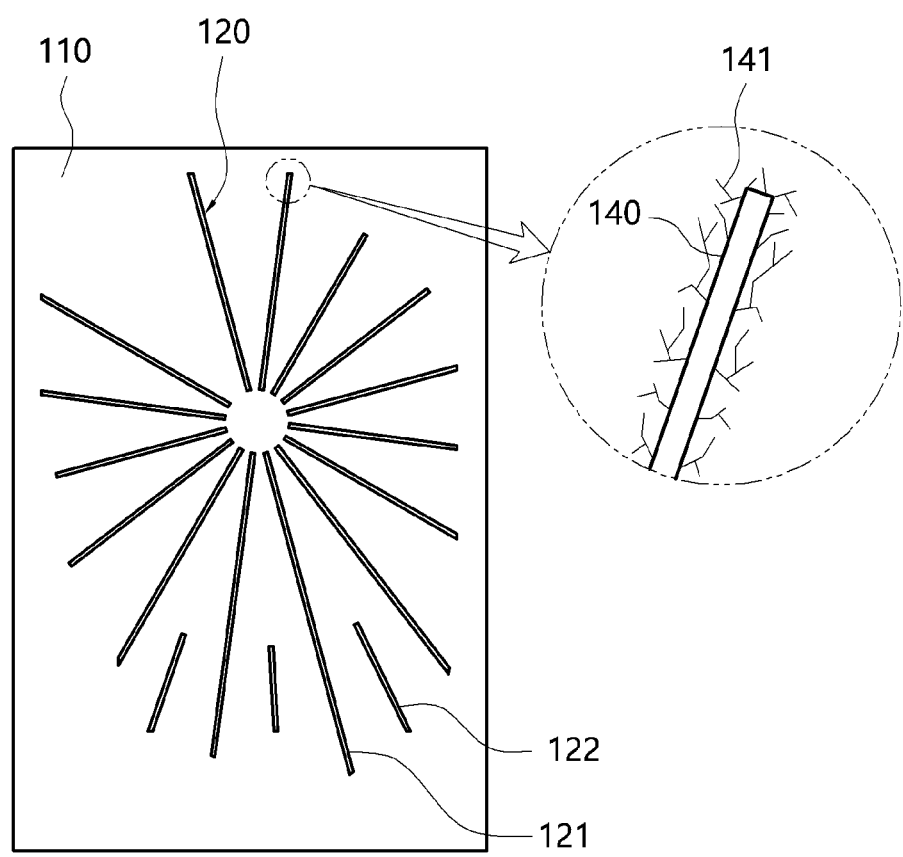
FIG. 4 is a view showing another form of an eddy current-reducing pattern part that can be applied to FIG. 1.

Meanwhile, the eddy current-reducing pattern part 120 may be a part that physically deforms the shielding part 110 by forming a crack part 130 as shown in FIG. 3 or a penetration part 140 as shown in FIG. 4 in a partial region of the shielding part 110 to reduce the occurrence of eddy current.

As a specific example, the eddy current-reducing pattern part 120 may be formed by the crack part 130. That is, as shown in FIG. 3, the eddy current-reducing pattern part 120 may be a crack part 130 that is a part where the shielding part 110 is formed by being separated into a plurality of pieces by forming a plurality of cracks 131 having a predetermined width and length in the shielding part 110.

Herein, the crack 131 may be formed by pressing the shielding part 110 using a pressing member.

In this case, the remaining portion of the entire region of the shielding part 110 in which the crack part 130 is not formed may not be separated into a plurality of pieces.

In an embodiment of the present invention, a plurality of pieces separated by the crack 131 may be cut off from each other but remain in contact with each other (see part A of FIG. 2), and a fine space may be formed between the plurality of pieces (see part B of FIG. 2). The fine space formed in this way is similar at first glance in that a space is formed in the shielding part 110 compared to the penetration part 140, which will be described later, but can be distinguished from the penetration part 140 in that its width is very fine.

As a non-limiting example, the crack part 130 may be formed linearly with a predetermined width and length as shown in FIG. 3.

Meanwhile, in the shielding part 110, cracks 131 may not only be formed in the linear area, but additionally, a plurality of cracks 132 may be formed extending from an edge defining the crack part 130. This plurality of cracks 132 may be formed to extend outward from the edge defining the crack part 130 in the process of pressing the shielding part 110 using a pressing member to form a crack 131 for a partial area of the shielding part 110.

As another example, the eddy current-reducing pattern part 120 may be formed by the penetration part 140 in addition to the crack part 130 described above.

In more detail, the eddy current-reducing pattern part 120 may include a penetration part 140 formed in the inner region of the shielding part 110, as shown in FIG. 4, and a plurality of cracks 141 formed to extend from the penetration part 140.

In this case, the penetration part 140 may be formed to penetrate the shielding part 110 in the thickness direction of the shielding part 110. For example, the penetration part 140 may be formed by pressing and penetrating the shielding part 110 using a mold including a blade.

Next, the plurality of cracks 141 may be formed to extend from the penetration part 140 as shown in the drawing. Herein, the plurality of cracks 141 may be ones formed in the periphery of the penetration part 140 through an external force applied to the shielding part 110 in the process of forming the penetration part 140 in the shielding part 110.

In an embodiment of the present invention, similar to the crack part 130, the penetration part 140 may also be formed linearly with a predetermined width and length.

Meanwhile, the above-described crack part 130 and penetration part 140 are only specific examples of the eddy current-reducing pattern part 120, and the formation of the eddy current-reducing pattern part 120 of the magnetic field shielding sheet 100 according to an embodiment of the present invention is not limited to this. That is, the eddy current-reducing pattern part 120 may have any shape as long as it can increase the resistance of the shielding part 110. For example, although not shown, the penetration part 140 of FIG. 4 may be formed through a process such as etching, or may be formed using a laser or the like.

As such, the magnetic field shielding sheet 100 according to an embodiment of the present invention can increase the overall resistance of the shielding part 110 by locally forming the eddy current-reducing pattern part 120 such as the crack part 130 or the penetration part 140 in a partial region corresponding to the region in which the antennas 220 and 230 are disposed, as well as can prevent performance degradation of the magnetic field shielding sheet by minimizing physical deformation of the shielding part 110 compared to performing a flake process on the entire shielding part 110.

In an embodiment of the present invention, the eddy current-reducing pattern part 120 may include a first eddy current-reducing pattern part 121 and a second eddy current-reducing pattern part 122.

First, the first eddy current-reducing pattern part 121 may an eddy current-reducing pattern part 120 formed to intersect both the wireless power transfer antenna 220 and the wireless communication antenna 230 constituting the antenna unit 200 or 200'.

In this case, as shown in FIGS. 3 and 4, the first eddy current-reducing pattern part 121 may be extended to have a relatively long length compared to the second eddy current-reducing pattern part 122 to be described later, so that it may be disposed to intersect both the wireless power transfer antenna 220 and the wireless communication antenna 230.

Through this, the magnetic field shielding sheet 100 according to an embodiment of the present invention can reduce the influence of eddy currents on the plurality of antennas 220 and 230 with only the first eddy current-reducing pattern part 121, which has a predetermined area and is formed in a single shape.

Next, the second eddy current-reducing pattern part 122 may be formed to intersect only one antenna of the wireless power transfer antenna 220 and the wireless communication antenna 230.

In this case, as shown in FIGS. 3 and 4, the second eddy current-reducing pattern part 122 can reduce the influence of eddy currents on a local region that is difficult to cover with only the first eddy current-reducing pattern part 121, which covers a wide region.

Figure 5:
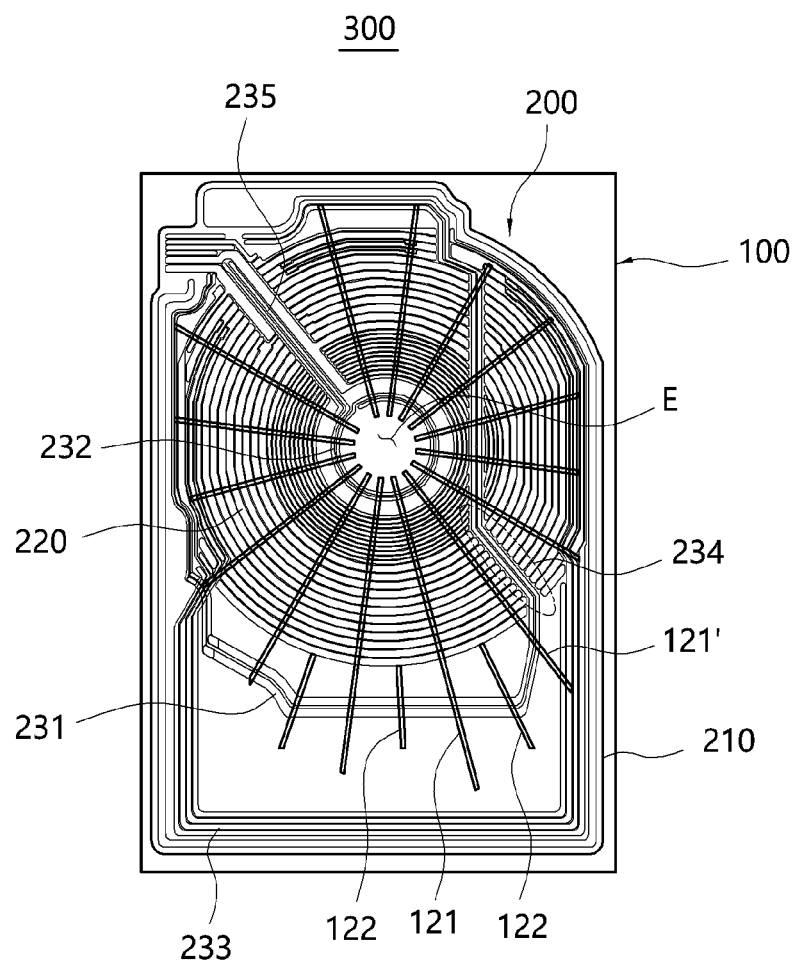
FIG. 5 is a plan view of a wireless power transfer module according to one embodiment of the present invention.
Figure 6:
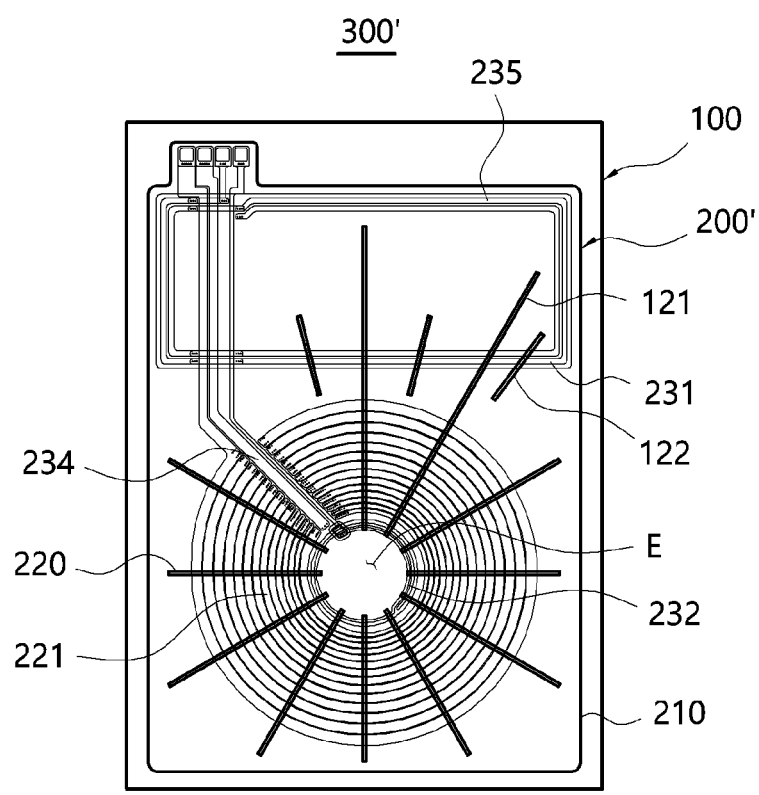
FIG. 6 is a plan view of a wireless power transfer module according to another embodiment of the present invention.

Meanwhile, FIGS. 5 and 6 show an example of an antenna unit 200 or 200' to which the magnetic field shielding sheet 100 according to an embodiment of the present invention can be applied. Hereinafter, with reference to FIGS. 5 and 6, the antenna unit 200 or 200' to which the magnetic field shielding sheet 100 having the first eddy current-reducing pattern part 121 and the second eddy current-reducing pattern part 122 is applied will be described in detail.

In an embodiment of the present invention, the antenna unit 200 or 200' may be a combo antenna unit including a wireless power transfer antenna 220 and a wireless communication antenna 230, as described above.

Herein, as shown in FIGS. 5 and 6, the wireless power transfer antenna 220 may include a radiation pattern 221 disposed on one side of a circuit board 210 and wound multiple times around a central portion E having a predetermined area.

Next, the wireless communication antenna 230 may include a first pattern 231, a second pattern 232, and connection patterns 233 and 234.

In this case, the first pattern 231, the second pattern 232, and the connection patterns 233 and 234 may each refer to a portion of the entire wireless communication antenna 230. And, the first pattern 231, the second pattern 232, and the connection patterns 233 and 234 may be formed to be physically connected to each other, or each may be formed independently.

In addition, the first pattern 231, the second pattern 232, and the connection patterns 233 and 234 may all be formed with the same type of antenna, or may be formed by mixing different types of antennas. For example, the above-described first pattern 231, second pattern 232, and connection patterns 233 and 234 may all be formed as NFC antennas, or may be formed by mixing an NFC antenna and an MST antenna.

Further, the wireless communication antenna 230 may be formed to include all of the first pattern 231, the second pattern 232, and the connection patterns 233 and 234, or be formed to include only some of the above-described patterns.

Specifically, the first pattern 231 is a portion disposed outside the above-described radiation pattern 221 among the wireless communication antenna 230, and as shown in the drawing, may be arranged to be spaced apart from the radiation pattern 221 by a predetermined distance.

In this case, the first pattern 231 may be disposed in a space between the radiation pattern 221 and the outer edge of the shielding part 110 to improve wireless communication sensitivity in that space.

And, the first pattern 231 may be extended in a straight line form as shown in the drawing, may be extended in a circularly wound form similar to the radiation pattern 221, or may be formed to include both straight line and circular patterns. Meanwhile, the first pattern 231 shown in the drawing is only an example of the first pattern 231, and the first pattern 231 may have any shape as long as it is a part of the patterns of the wireless communication antenna 230 and is disposed outside the wireless power transfer antenna 220.

Next, the second pattern 232 is disposed inside the radiation pattern 221, that is, in a central portion E of the wireless power transfer antenna 220, and may be arranged in a wound form to form a circular loop similar to the wireless power transfer antenna 220.

In this case, the second pattern 232 may be disposed to increase wireless communication sensitivity in a region adjacent to the central portion E.

And, unlike the first pattern 231 and the second pattern 232 described above, the connection patterns 233 and 234 may be disposed to overlap the radiation pattern 221 of the wireless power transfer antenna 220.

In an embodiment of the present invention, the connection patterns 233 and 234 may refer to a partial region extending in the radial direction of the radiation pattern 221 as shown in FIGS. 5 and 6 among various patterns of the wireless communication antenna 230 overlapping with the wireless power transfer antenna 220.

As a specific example, the connection patterns 233 and 234 may include a first connection pattern 233 whose one end is connected to the above-described first pattern 231. In this case, the first connection pattern 233 may be disposed in a form that traverses the radiation pattern 221 to connect the first pattern 231 to a terminal or another pattern side directly without bypassing the radiation pattern 221 on the circuit board 210 having a limited area.

As another example, the connection patterns 233 and 234 may include a second connection pattern 234 having one end connected to the second pattern 232. In this case, the second connection pattern 234 may be disposed to traverse the radiation pattern 221 to connect the second pattern 232 disposed inside the radiation pattern 221 to a terminal or another pattern.

Meanwhile, referring to FIGS. 5 and 6, a third pattern 235 may be disposed in a region adjacent to the outer edge of the shielding part 110.

This third pattern 235 is a non-limiting example and may be disposed to transfer heat emitted from the antenna unit 200 or 200' to a separate heat dissipation member (not shown) or a sensor member (not shown) for detecting temperature.

Looking at the specific positional relationship between the antenna unit 200 or 200' and the eddy current-reducing pattern part 120 with reference to the above description, as shown in FIGS. 5 and 6, the first eddy current-reducing pattern part 121 may include linear patterns in which a plurality of linear patterns are radially disposed around the central portion E of the wireless power transfer antenna 220.

Through this, the first eddy current-reducing pattern part 121 may intersect both the wireless power transfer antenna 220 and the wireless communication antenna 230, as described above.

Specifically, the first eddy current-reducing pattern part 121 may intersect the radiation pattern 221 of the wireless power transfer antenna 220 and at the same time intersect at least one of the first pattern 231 and the second pattern 232 of the wireless communication antenna 230.

For example, the first eddy current-reducing pattern part 121 may intersect both the first pattern 231 and the second pattern 232 formed on the outside and inside of the radiation pattern 221, and through this, even with the first eddy current-reducing pattern part 121, it is possible to reduce the overall influence of eddy currents on respective parts 231 and 232 of the wireless communication antenna, which are positioned spaced apart from each other with the wireless power transfer antenna 220 interposed therebetween.

However, the application of the magnetic field shielding sheet 100 according to an embodiment of the present invention is not limited to this, and depending on the design, the first eddy current-reducing pattern part 120 may be disposed to intersect only one of the first pattern 231 and the second pattern 232.

Meanwhile, referring back to FIGS. 5 and 6, the first eddy current-reducing pattern part 121 may be formed to be located to avoid a region where the wireless power transfer antenna 220 and the wireless communication antenna 230 overlap with each other.

For example, as shown in the drawing, the first eddy current-reducing pattern part 121 may be disposed in a region other than in a region in which the first connection pattern 233 connected to the first pattern 231 is disposed or in a region in which the second connection pattern 234 connected to the second pattern 232 is disposed, among the radiation pattern 221.

In this regard, the inventor of the present invention conducted an experiment by comparing the case where the eddy current-reducing pattern part 120 is arranged to overlap the connection patterns 233 and 234 with the case where the eddy current-reducing pattern part 120 is arranged to avoid the connection patterns 233 and 234. As a result of the experiment, it was confirmed that the performance such as recognition distance of the NFC antenna was deteriorated when the eddy current-reducing pattern part 120 was arranged to overlap the connection patterns 233 and 234, whereas it was confirmed that the performance of the wireless communication antenna 230 was improved when it was placed to avoid the connection patterns 233 and 234.

As such, the magnetic field shielding sheet 100 according to an embodiment of the present invention may arrange the eddy current-reducing pattern part 120 to avoid a region where the wireless power transfer antenna and the wireless communication antenna overlap with each other, thereby preventing antenna performance from being deteriorated due to the introduction of the eddy current-reducing pattern part.

Meanwhile, the second eddy current-reducing pattern part 122 may be disposed between at least one pair of first eddy current-reducing pattern parts 121 disposed adjacent to each other and be disposed to intersect with the pattern of the wireless communication antenna 230.

As a specific example, the second eddy current-reducing pattern part 122 may be disposed to partially intersect only the first pattern 231 disposed outside the radiation pattern 221 as shown in FIGS. 5 and 6, thereby reducing the influence of eddy current on the antenna pattern disposed in a region between the first eddy current-reducing pattern parts 121.

Further, in the drawing, the drawing shows that the second eddy current-reducing pattern part 122 is formed only on the outside of the radiation pattern 221, but the second eddy current-reducing pattern part 122 may be disposed between the first eddy current-reducing pattern parts 121, and may be formed to intersect the second pattern 232 provided inside the radiation pattern 221.

In addition, the second eddy current-reducing pattern part 122 may be disposed in a plurality of regions requiring eddy current reduction on the shielding part 110, as shown in the drawing, and depending on the size of the space formed between the plurality of first eddy current-reducing pattern parts 121, the second eddy current-reducing pattern parts 122 may have different areas.

As such, the magnetic field shielding sheet 100 according to an embodiment of the present invention includes a second eddy current-reducing pattern part 122 having relatively small area loss, so that the number of first eddy current-reducing pattern parts 121 that are formed in a relatively large area to reduce the magnetic permeability of the shielding part 110 can be minimized, while partially supplementing the effect of eddy current reduction to secure antenna performance.

As a result, the magnetic field shielding sheet 100 according to an embodiment of the present invention can minimize the effect from eddy current and, for example, can have a high magnetic permeability of 2,000 or more and a high saturation magnetic flux density of 1.7 T or more even at a very thin thickness of 55 to 85 μm in total thickness.

Through this, the magnetic field shielding sheet 100 according to an embodiment of the present invention can meet the design conditions required as a magnetic field shielding sheet without expanding the area or thickness of the magnetic field shielding sheet. As a result, the magnetic field shielding sheet 100 according to an embodiment of the present invention can be easily applied to the design of the latest portable terminals that require intensive arrangement of components, such as foldable phones.

However, the structure of the antenna unit 200 or 200' and the arrangement position of the eddy current-reducing pattern part 120 described above are only specific examples, and the magnetic field shielding sheet 100 according to an embodiment of the present invention can also be applied to various types of antenna units not shown in the drawing.

Meanwhile, the magnetic field shielding sheet 100 according to an embodiment of the present invention described above may be implemented as a wireless power transfer module 300 or 300' for wireless power transfer.

For example, as shown in FIGS. 5 and 6, the wireless power transfer module 300,300' may include an antenna unit 200 or 200' including a wireless power transfer antenna 220 for wireless power reception and a wireless communication antenna 230 for wireless communication, and a magnetic field shielding sheet 100 disposed on one surface of the antenna unit 200 or 200' to shield the magnetic field and focus the magnetic field in a desired direction.

Herein, as described above, in the antenna unit 200 or 200', the wireless communication antenna 230 and the wireless power transfer antenna 220 may be disposed adjacent to each other on one surface of the circuit board.

In addition, the wireless power transfer antenna 220 and the wireless communication antenna 230 may be composed of a flat coil or may be formed in a pattern on one surface of the circuit board 210.

And, the wireless communication antenna 230 may be, for example, an MST (magnetic secure transfer) antenna for magnetic payment or an NFC (near field communication) antenna for near field communication, or may be formed to include both an MST antenna and an NFC antenna.

The wireless power transfer module 300 or 300' may be implemented as a wireless power reception module that the wireless power transfer antenna 220 serves as a wireless power reception antenna for receiving wireless power, or may be implemented as a wireless power transmission module that that the wireless power transfer antenna 220 serves as a wireless power transmission antenna to transmit wireless power to the outside.

Further, when the wireless power transfer module 300 or 300' is implemented as a wireless power reception module, the wireless power transfer module 300 or 300' may be applied to portable terminal devices such as mobile phones and tablet PCs.

Although embodiments of the present invention have been described above, the idea of the present invention is not limited to the embodiments set forth herein. Those of ordinary skill in the art who understand the idea of the present invention may easily propose other embodiments through supplement, change, removal, addition, etc. of elements within the scope of the same idea, but the embodiments will be also within the idea scope of the present invention.

The invention claimed is:

1. A magnetic field shielding sheet, attached to a wireless power transfer antenna and a wireless communication antenna, the magnetic field shielding sheet comprising:
   a shielding part made of a magnetic material so as to shield a magnetic field; and
   at least one eddy current-reducing pattern part which is formed in the shielding part to increase the resistance of the shielding part and thereby reduce the generation of eddy currents,
   wherein the eddy current-reducing pattern part comprises:
   a first eddy current-reducing pattern part formed to intersect with both the wireless power transfer antenna and the wireless communication antenna; and
   a second eddy current-reducing pattern part formed to intersect with the wireless communication antenna.

2. The magnetic field shielding sheet of claim 1,
   wherein a plurality of first eddy current-reducing pattern parts are disposed radially around a central portion of the wireless power transfer antenna, and
   the second eddy current-reducing pattern part is formed to intersect with the pattern of the wireless communication antenna between at least one pair of the first eddy current-reducing pattern parts disposed adjacent to each other.

3. The magnetic field shielding sheet of claim 1,
   wherein the first eddy current-reducing pattern part and the second eddy current-reducing pattern part are formed linearly with a predetermined width and length, and
   the length of the second eddy current-reducing pattern part is smaller than the length of the first eddy current-reducing pattern part.

4. The magnetic field shielding sheet of claim 1,
wherein the wireless communication antenna comprises a first pattern disposed outside the wireless power transfer antenna and a first connection pattern connected to the first pattern, and
the eddy current-reducing pattern part is disposed so as not to overlap the first connection pattern.

5. The magnetic field shielding sheet of claim 4,
wherein the wireless communication antenna comprises a second pattern disposed inside the wireless power transfer antenna and a second connection pattern connected to the second pattern, and
the eddy current-reducing pattern part is arranged so as not to overlap the second connection pattern.

6. A wireless power transfer module, comprising:
a combo antenna unit comprising a wireless power transfer antenna and a wireless communication antenna formed in a pattern on upper portion of a circuit board; and
a magnetic field shielding sheet disposed on one surface of the combo antenna unit,
wherein the magnetic field shielding sheet comprising:
a shielding part made of a magnetic material so as to shield a magnetic field; and
at least one eddy current-reducing pattern part which is formed in the shielding part to increase the resistance of the shielding part and thereby reduce the generation of eddy currents,
wherein the eddy current-reducing pattern part comprises:
a first eddy current-reducing pattern part formed to intersect with both the wireless power transfer antenna and the wireless communication antenna; and
a second eddy current-reducing pattern part formed to intersect with the wireless communication antenna.

7. The magnetic field shielding sheet of claim 6,
wherein a plurality of first eddy current-reducing pattern parts are disposed radially around a central portion of the wireless power transfer antenna, and
the second eddy current-reducing pattern part is formed to intersect with the pattern of the wireless communication antenna between at least one pair of the first eddy current-reducing pattern parts disposed adjacent to each other.

8. The magnetic field shielding sheet of claim 6,
wherein the first eddy current-reducing pattern part and the second eddy current-reducing pattern part are formed linearly with a predetermined width and length, and
the length of the second eddy current-reducing pattern part is smaller than the length of the first eddy current-reducing pattern part.

9. The magnetic field shielding sheet of claim 6,
wherein the wireless communication antenna comprises a first pattern disposed outside the wireless power transfer antenna and a first connection pattern connected to the first pattern, and
the eddy current-reducing pattern part is disposed so as not to overlap the first connection pattern.

10. The magnetic field shielding sheet of claim 9,
wherein the wireless communication antenna comprises a second pattern disposed inside the wireless power transfer antenna and a second connection pattern connected to the second pattern, and
the eddy current-reducing pattern part is arranged so as not to overlap the second connection pattern.

* * * * *